Figure 1:
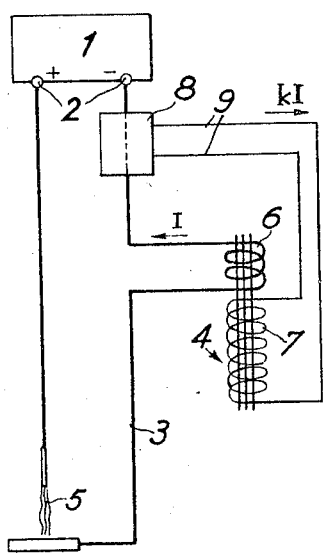

Aug. 2, 1966  F. MARCHAND  3,264,522

SHIELDED ARC WELDING GENERATOR

Filed June 4, 1963

United States Patent Office 3,264,522
Patented August 2, 1966

3,264,522
SHIELDED ARC WELDING GENERATOR
Ferdinand Marchand, Commercy, France, assignor to Trefileries et Ateliers de Commercy, Commercy, France, a societe anonyme
Filed June 4, 1963, Ser. No. 285,329
2 Claims. (Cl. 315—284)

This invention relates to improvements in shielded arc welding generators of the type employing an electrode melting in a gaseous atmosphere.

Arc welding in a gaseous shielding atmosphere with a bare wire electrode is a well known method now a developing considerably for steel welding.

Welding in any position and the use of carbon dioxide as a shielding gas for welding plain carbon steel is now commercial practice due to the use of short arcs producing a droplet-type fusion of the wire electrode.

Developed for welding plain carbon steels in a carbon dioxide atmosphere this fusion of the wire electrode in the form of droplets proved also advantageous on the one hand with other gases or gaseous mixtures and, on the other hand, with other metals and alloys.

In fact, these droplets create in the electric arc a rapid sequence of alternate short-circuits and arc restriking and necessitate a special design and construction of the current generator in order to impart a proper stability to the arc. As a rule use is made of rectifying transformers having very flat and nearly horizontal external characteristics possessing in the direct-current circuit an inductance damping out overcurrents occurring as the droplets clear the electrode gap or arc. Therefore, these generators, at the precise moment when a metal droplet passes through the arc, deliver an overcurrent sufficient to fuse the metal bridge created by the droplet but nevertheless low enough to avoid any metal projections.

A serious drawback of these inductances is their saturation due to the welding direct-current and therefore their necessarily large dimensions, and more particularly the fact that an adjustment is required as a function of this current strength.

Manual-adjustment compensation systems are already known wherein the inductance, in addition to the main winding receiving the welding current, comprises an auxiliary winding through which a constant current adjusted manually by the operator is caused to flow, this manual adjustment being effected by means of a rheostat or any other known and suitable device. However, the appreciation of the degree of damping action to be applied to the current variations is delicate and requires considerable skill from the operator and it is the essential object of this invention to overcome this difficulty by providing means capable of effecting this adjustment in a completely automatic manner, that is, without any intervention from the operator.

To this end, the shielded arc welding generator utilizing an electrode melting in a gaseous atmosphere, and comprising an inductance inserted in the direct-current circuit and formed of a main winding receiving the welding current and an auxiliary winding delivering the ampere-turns compensating the ampere-turns of the main-winding, is characterized in that means are provided whereby a current of a strength proportional to the welding current strength is caused to flow through said auxiliary winding of the inductance, whereby the ampere-turns of said auxiliary winding compensate those of the main winding throughout the range of adjustment points, thus dispensing with any manual intervention from the operator.

Practical tests also proved that with the inductance of this invention a very considerable additional advantage was obtained. With conventional inductances the impedance value for a given current is limited at the top by the occurrence of an arc instability.

With an inductance according to the present invention this limit-value can be increased considerably while preserving a good arc stability. As a consequence the fusion is smoother and the welds have an improved appearance.

Figure 2:
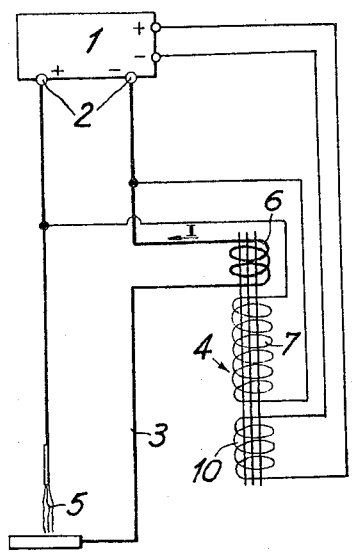
Figure 3:
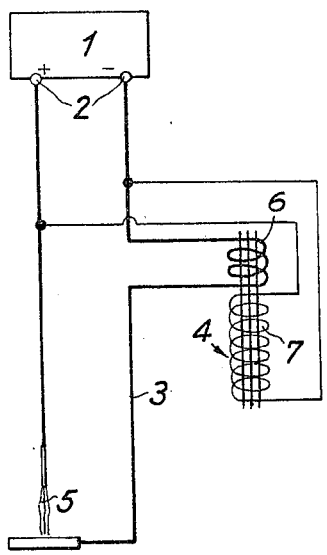

Different forms of embodiment of the present invention will now be described by way of example with reference to the accompanying drawing, wherein:

FIGURES 1, 2 and 3 are wiring diagrams showing three different arrangements of shielded-arc welding generators constructed according to the teachings of this invention.

In FIG. 1 the welding generator comprises a rectifying transformer 1 delivering welding direct-current across its output terminals 2. In the direct-current circuit illustrated in the form of a thick conductor 3 there is inserted in a known manner an inductive reactance 4 adapted to damp out overcurrents when the electrode droplets pass through the arc 5. This inductive reactance comprises a main winding 6 having a relatively low number of turns of relatively thick wire and through which the welding current I is caused to flow. The inductive reactance 4 also comprises an auxiliary winding 7 comprising a relatively high number of turns of relatively thin wire. Through this auxiliary winding 7 a unidirectional current is circulated, such that the ampere-turns produced by the auxiliary winding 7 compensate the ampere-turns caused by the passage of welding current through the main winding 6.

In order to obtain this compensation throughout the range of welding adjustments, the strength of the current flowing through the auxiliary winding 7 must be proportional—according to the ratio of the numbers of turns of the two windings 6 and 7—to the welding current value I. To this end, there is provided, according to the present invention, a device 8 adapted to measure the value of the welding current strength I and to deliver from its output terminals to the conductors 9 leading to the auxiliary winding 7 a current having a strength $kI$ proportional to the aforesaid welding current strength.

The device 8 may comprise notably a shunt connected in series in the circuit through which the welding direct-current flows, said shunt being connected to the D.C. control input winding of a magnetic amplifier delivering at its output an A.C. rectified current of a strength proportional to the strength of the welding current.

According to a modified embodiment the assembly illustrated diagrammatically in FIG. 2 may also be used wherein the same component elements as in FIG. 1 are designated by the same reference numerals. In fact, experience teaches that the points of optimum fusion in steel welding on the diagram of voltages as a function of current strengths ($U=F(I)$) are distributed along an ascending straight line. It may be inferred therefrom that if the welding conditions are selected along this optimum curve the voltage variations are proportional to the current variations. Under these conditions, the desired compensation is obtained by simply connecting the auxiliary winding 7 in parallel with the welding arc 5.

However, the aforesaid ascending straight line receiving the points of optimum fusion in the diagram $U=F(I)$ will not pass through the zero point, since its equation is of the $U=aI+b$ type. To obtain a precise cancellation of the saturation caused by the welding current throughout the range of adjustments, a third winding or coil 10 must be introduced and a separate direct-current feed connected thereto. The ampere-turns supplied by this additional winding 10 constitute somewhat the term $b$ of the preceding equation.

Since practical tests proved that the exact cancellation of the saturation was superfluous as far as the arc itself was concerned, the inductive reactance can be constructed without this third coil for obvious reasons of economy, as shown in FIG. 3 of the drawing. The precise cancellation of the saturation is obtained for an average value of the welding current.

Similarly, experience teaches that an inductance according to this invention and as described hereinabove was perfectly adequate without altering the welding process when using: other gases or gaseous mixtures, or other metals and alloys.

The saturation is compensated in all cases with a sufficient approximation.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. Arc welding generator of the type utilizing an electrode fusible in a gaseous shielding atmosphere comprising a rectifying transformer, a direct current circuit connecting said electrode to said rectifying transformer, an inductive reactance inserted in said direct current circuit, said inductive reactance comprising a main winding inserted in the direct current circuit and receiving the welding current and an auxiliary winding magnetically coupled to said main winding, said auxiliary and main windings being so wound that their associated fields are phase opposed, and means for automatically causing a current of a strength proportional to that of said welding current to flow through said auxiliary winding, so that the ampere-turns of said auxiliary winding compensate those of said main winding.

2. Generator as set forth in claim 1, in which the voltage variations are selected to be proportional to the current variations and wherein said auxiliary winding of said inductance is connected in parallel to the welding arc.

References Cited by the Examiner

UNITED STATES PATENTS

| | | | |
|---|---|---|---|
| 2,798,934 | 7/1957 | Bruma | 219—60 |
| 2,880,374 | 3/1959 | Mulder | 315—284 X |
| 2,880,375 | 3/1959 | Cresswell | 315—284 |
| 2,951,972 | 9/1960 | Pomazal | 315—311 |

FOREIGN PATENTS

Ad. 61,361  11/1954  France.

JOHN W. HUCKERT, *Primary Examiner.*

RICHARD M. WOOD, ROBERT SEGAL,
*Examiners.*

S. D. SCHLOSSER, *Assistant Examiner.*